US012634953B2

(12) United States Patent
Liu

(10) Patent No.: US 12,634,953 B2
(45) Date of Patent: May 19, 2026

(54) METHOD FOR TRANSMITTING INFORMATION, APPARATUS, TERMINAL, DEVICE AND MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 407 days.

(21) Appl. No.: 18/029,244

(22) PCT Filed: Sep. 30, 2020

(86) PCT No.: PCT/CN2020/119715
§ 371 (c)(1),
(2) Date: Mar. 29, 2023

(87) PCT Pub. No.: WO2022/067792
PCT Pub. Date: Apr. 7, 2022

(65) Prior Publication Data
US 2023/0413282 A1      Dec. 21, 2023

(51) Int. Cl.
*H04W 72/232* (2023.01)
*H04L 5/00* (2006.01)

(52) U.S. Cl.
CPC ......... *H04W 72/232* (2023.01); *H04L 5/0035* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 10,638,337 B2 * | 4/2020 | Bendlin | .............. H04W 28/065 |
| 2015/0003352 A1 | 1/2015 | Seo et al. | |
| 2015/0237604 A1 | 8/2015 | Shi et al. | |
| 2017/0223725 A1 | 8/2017 | Xiong et al. | |
| 2018/0278395 A1 * | 9/2018 | Yoon | ................... H04L 27/2613 |
| 2018/0279273 A1 * | 9/2018 | Yang | ................... H04B 7/0613 |
| 2019/0260545 A1 | 8/2019 | Wang et al. | |

(Continued)

FOREIGN PATENT DOCUMENTS

| | | |
|---|---|---|
| CN | 106850018 A | 6/2017 |
| CN | 108811122 A | 11/2018 |

(Continued)

OTHER PUBLICATIONS

International Search Report of PCT/CN2020/119715 dated Jun. 24, 2021 with English translation, (4p).

(Continued)

*Primary Examiner* — Duc T Duong
(74) *Attorney, Agent, or Firm* — Arch & Lake LLP; Hao Tan; Shen Wang

(57) ABSTRACT

The present disclosure relates to a method for transmitting information and apparatus, which belong to the technical field of communications. The method includes: jointly sending, through at least two transmission reception points or at least two antenna panels, information carried on at least two physical downlink control channels, information carried on different PDCCHs in the at least two PDCCHs is transmitted through different TRPs or different antenna panels.

12 Claims, 4 Drawing Sheets

(56) References Cited

U.S. PATENT DOCUMENTS

| | | | | |
|---|---|---|---|---|
| 2020/0008235 | A1 | 1/2020 | Sarkis et al. | |
| 2020/0029310 | A1* | 1/2020 | Lee | H04W 72/23 |
| 2020/0119877 | A1* | 4/2020 | Wang | H04L 5/0035 |
| 2020/0153543 | A1 | 5/2020 | Khoshnevisan et al. | |
| 2020/0177254 | A1* | 6/2020 | Lee | H04B 7/063 |
| 2021/0105117 | A1* | 4/2021 | Abdelghaffar | H04L 27/2613 |
| 2021/0144038 | A1* | 5/2021 | Davydov | H04L 5/0023 |
| 2021/0226754 | A1* | 7/2021 | Khoshnevisan | H04L 5/0051 |
| 2021/0376898 | A1* | 12/2021 | Levitsky | H04W 24/10 |
| 2022/0029762 | A1* | 1/2022 | Ren | H04J 13/0062 |
| 2022/0174660 | A1* | 6/2022 | Ji | H04W 72/0446 |
| 2022/0190980 | A1* | 6/2022 | Matsumura | H04L 5/0032 |
| 2022/0295589 | A1* | 9/2022 | Tsai | H04B 17/309 |
| 2022/0302989 | A1* | 9/2022 | Zhang | H04W 76/19 |
| 2022/0345191 | A1* | 10/2022 | Guo | H04B 7/0686 |
| 2023/0125598 | A1* | 4/2023 | Sun | H04W 72/12 |
| | | | | 370/329 |
| 2023/0171771 | A1* | 6/2023 | Guo | H04L 5/0094 |
| | | | | 370/329 |
| 2023/0198721 | A1* | 6/2023 | Gao | H04L 5/0082 |
| | | | | 370/329 |
| 2023/0208594 | A1* | 6/2023 | Yu | H04L 27/2605 |
| | | | | 370/329 |
| 2023/0208595 | A1* | 6/2023 | Xie | H04W 72/232 |
| | | | | 370/329 |
| 2023/0284235 | A1* | 9/2023 | Gao | H04W 72/23 |
| | | | | 370/329 |
| 2023/0292310 | A1* | 9/2023 | Li | H04W 72/23 |
| 2023/0396385 | A1* | 12/2023 | Kwak | H04L 5/0094 |

FOREIGN PATENT DOCUMENTS

| | | |
|---|---|---|
| CN | 109391413 A | 2/2019 |
| CN | 109891993 A | 6/2019 |
| CN | 110536457 A | 12/2019 |
| CN | 111130708 A | 5/2020 |
| CN | 111148260 A | 5/2020 |
| CN | 111200871 A | 5/2020 |
| CN | 111431685 A | 7/2020 |
| CN | 111448840 A | 7/2020 |

OTHER PUBLICATIONS

Interdigital Inc. "Design considerations for beam-based PDCCH", 3GPP TSG RAN WG1 Meeting #89 R1-1708345, Hangzhou, China, May 15-19, 2017 (4p).
The First CNOA issued in CN Application No. 202080002628.9 dated Dec. 20, 2024 with English translation, (17p).
CNOA issued in Application No. 202080002628.9 dated on Jun. 18, 2025, with English translation, (9p).
Samsung, "Association between antenna ports and ePDCCH transmissions", 3GPP TSG RAN WG1 #69, R1-122249, Prague, Czech Republic, May 21-25, 2012, (6p).
Huawei et al., "Enhancements on multi-TRP/panel transmission", 3GPP TSG RAN WG1 Meeting #99, R1-1911902, Reno, USA, Nov. 18-22, 2019, (16p).

\* cited by examiner

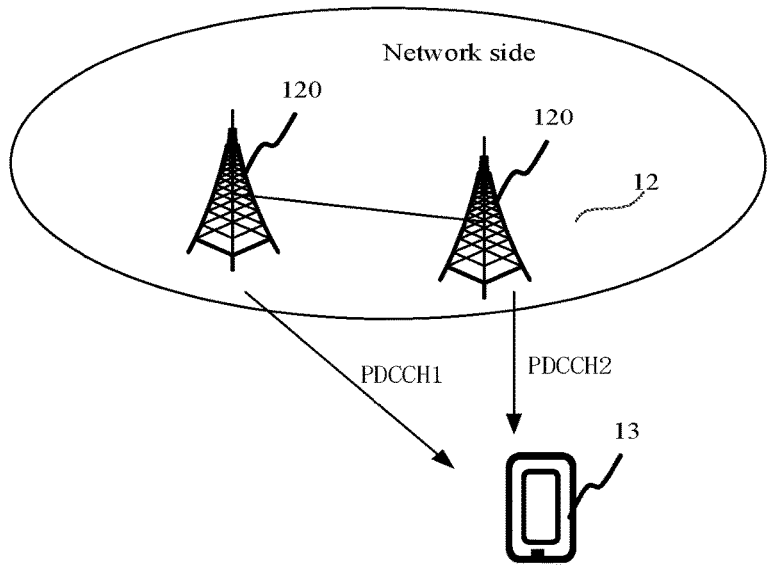

FIG. 1

101 information carried on at least two PDCCHs is jointly sent through at least two TRPs or at least two antenna panels, and information carried on different PDCCHs in the at least two PDCCHs is transmitted through different TRPs or different antenna panels

FIG. 2

201 information carried on at least two PDCCHs and jointly sent through at least two TRPs or at least two antenna panels by a network device is received, information carried on different PDCCHs in the at least two PDCCHs is transmitted through different TRPs or different antenna panels

FIG. 3

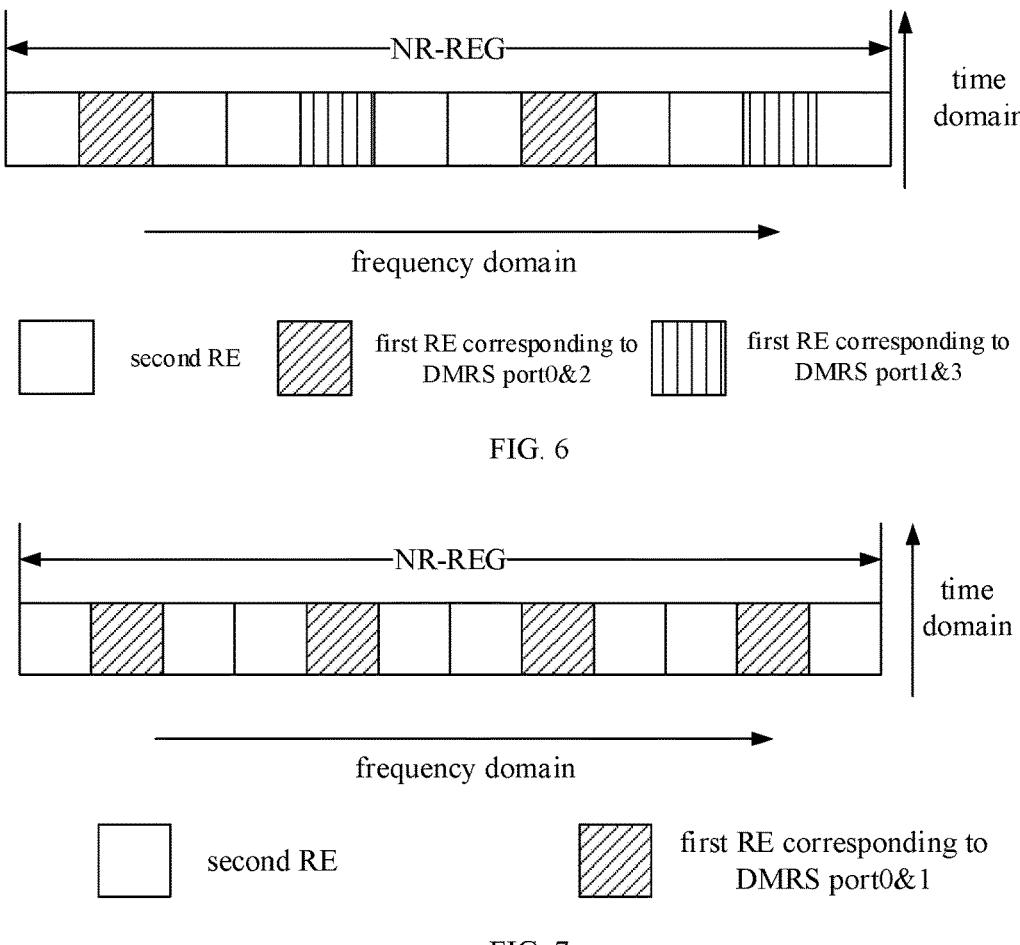
FIG. 6
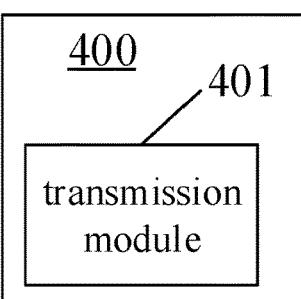
FIG. 7
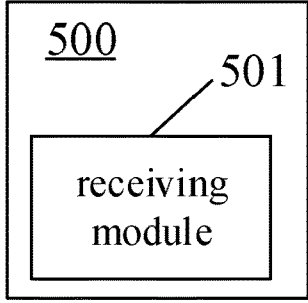
FIG. 8
FIG. 9

600

METHOD FOR TRANSMITTING INFORMATION, APPARATUS, TERMINAL, DEVICE AND MEDIUM

CROSS-REFERENCE

The present application is a U.S. National Stage of International Application No. PCT/CN2020/119715,filed on Sep. 30, 2020, the entire content of which is incorporated herein by reference for all purposes.

TECHNICAL FIELD

The present disclosure relates to a field of communication technology, and more particular to a method for transmitting information, apparatus, terminal, device and medium.

BACKGROUND

In a 5G New Radio (NR) technology, when a network device is provided with a plurality of transmission and reception points (TRPs), the network device may use the plurality of TRPs to collaborate and simultaneously transmit data with one terminal through a plurality of beams at a plurality of angles, so as to improve data transmission quality.

SUMMARY

Embodiments of the present disclosure provide a method for transmitting information, an apparatus, a terminal, a device and a medium. The technical solution is described as follows:

According to a first aspect of the present disclosure, a method for transmitting information is provided, performed by a network device and includes: jointly sending, through at least two transmission reception points TRPs or at least two antenna panels, information carried on at least two PDCCHs, wherein information carried on different PDCCHs in the at least two PDCCHs is transmitted through different TRPs or different antenna panels.

According to a second aspect of the present disclosure, a method for transmitting information is provided, performed by a terminal and includes: receiving information carried on at least two PDCCHs and jointly sent by a network device through at least two transmission reception points TRPs or at least two antenna panels, wherein information carried on different PDCCHs in the at least two PDCCHs is transmitted through different TRPs or different antenna panels.

According to a third aspect of the present disclosure, a network device is provided and includes:

a processor;

a memory configured to store executable instructions of the processor, wherein the processor is configured to load and perform: jointly send, through at least two transmission reception points (TRPs) or at least two antenna panels, information carried on at least two physical downlink control channels (PDCCHs), wherein information carried on different PDCCHs in the at least two PDCCHs is transmitted through different TRPs or different antenna panels.

According to a fourth aspect of the present disclosure, a terminal is provided and includes:

a processor;

a memory configured to store executable instructions of the processor, wherein the processor is configured to load and perform: receive information carried on at least two physical downlink control channels (PDCCHs) and jointly sent by a network device through at least two transmission reception points (TRPs) or at least two antenna panels, wherein information carried on different PDCCHs in the at least two PDCCHs is transmitted through different TRPs or different antenna panels.

It should be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and form a part of this specification, illustrate embodiments consistent with the disclosure and, together with the description, serve to explain the principles of the present disclosure.

FIG. 1 shows a block diagram of a communication system provided by a schematic embodiment of the present disclosure;

FIG. 2 is a flowchart of a method for transmitting information illustrated according to an embodiment;

FIG. 3 is a flowchart of a method for transmitting information illustrated according to an embodiment;

FIG. 6 is a resource distribution diagram of a PDCCH illustrated according to an embodiment;

FIG. 7 is a resource distribution diagram of a PDCCH illustrated according to an embodiment;

FIG. 8 is a structural diagram of an apparatus for transmitting information illustrated according to an embodiment;

FIG. 9 is a structural diagram of an apparatus for transmitting information illustrated according to an embodiment;

DETAILED DESCRIPTION

Figure 4:
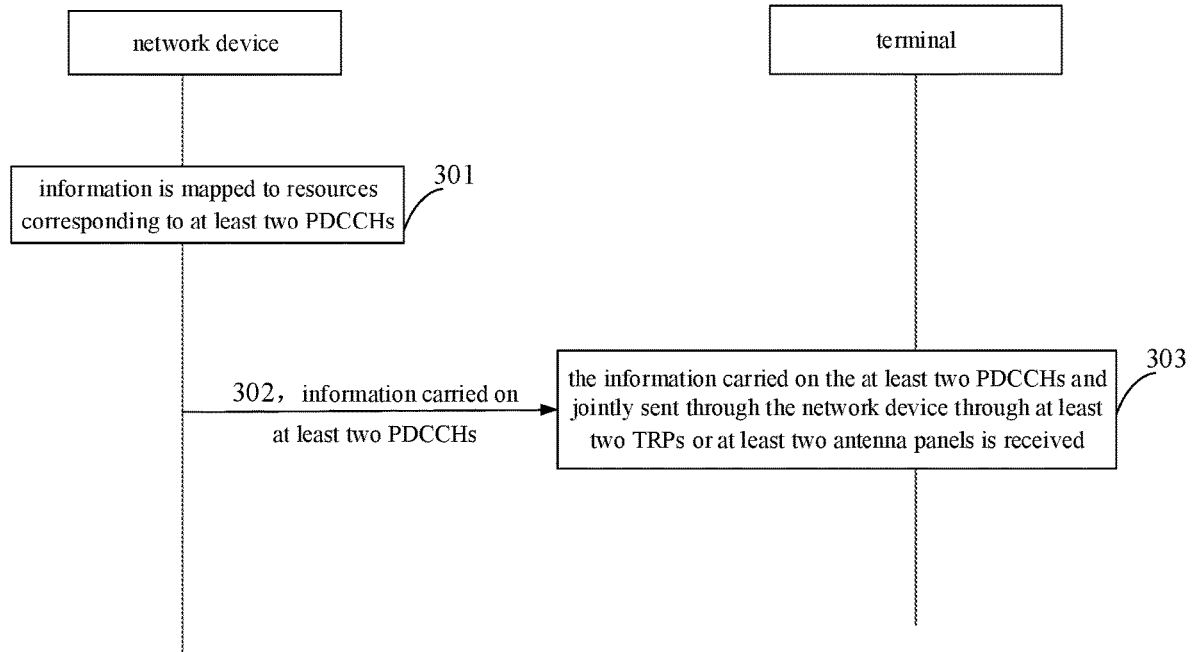
FIG. 4 is a flowchart of a method for transmitting information illustrated according to an embodiment.

Detailed description will be made here to embodiments, examples of which are illustrated in the accompanying drawings. When drawings are involved in the following description, identical numerals in different drawings refer to identical or similar elements, unless otherwise indicated. Implementations described in the following embodiments do not represent all the implementations consistent with the disclosure. On the contrary, they are merely examples of apparatuses and methods consistent with some aspects of the present disclosure recited in the appended claims.

Terms used in the present disclosure are merely for describing particular embodiments, and are not intended to restrict the present disclosure. Singular forms "a" or "an" used in the disclosure and the appended claims are also intended to include plural forms, unless clearly indicated otherwise in the context. It should also be understood that the term "and/or" used herein refers to and includes any or all possible combinations of one or a plurality of listed associated items.

It should be understood that though terms "first," "second," "third," or the like may be used to describe various pieces of information in the present disclosure, and the information should not be limited by these terms. These terms are merely used for distinguishing pieces of same-type information from one another. For example, without departing from the scope of the disclosure, "first information" may also be referred to as "second information," and similarly, "second information" may also be referred to as "first information." Depending on the context, the word "if" as used herein may be interpreted as "when," "while," or "in response to determining that.

It should be understood that although steps in the embodiments of the present disclosure are described in the way of numbering for ease of understanding, these numbers do not indicate an order in which the steps are performed, nor do they mean that the steps using sequential numbering must be executed together. It should be understood that one or several steps of the sequentially-numbered steps may be performed separately to solve a corresponding technical problem and achieve a predetermined technical solution. Even though the plurality of steps that are exemplarily listed together in the drawings, it does not mean that these steps must be performed together, and these steps are merely exemplarily listed in the attached drawings for ease of understanding.

The network device uses a plurality of TRPs to collaboratively send the information carried on a physical downlink shared channel (PDSCH), while information carried on a physical downlink control channel (PDCCH) is sent by a single TRP. If a link between the TRP and the terminal is blocked or in a deep fading state, the terminal cannot obtain the information carried on the PDCCH, such that transmission reliability of the PDCCH is low.

FIG. 1 shows a block diagram of a communication system provided by a schematic embodiment of the present disclosure. As illustrated in FIG. 1, the communication system may include: a network side 12 and a terminal 13.

The network side 12 includes several network devices 120. The network device 120 may be a base station, in which the base station is an apparatus deployed in an access network to provide wireless communication functions for terminals. The base station may be either a base station of a service cell of the terminal 13 or a base station of a cell adjacent to the service cell of the terminal 13. The base station may include various forms of macro base stations, micro base stations, relay stations, access points, transmission reception points (TRPs), etc. In the systems adopting different wireless access technologies, names of the devices with the base station function may vary. For example, in a 5G NR system, it is referred to as gNodeB or gNB. With the evolution of communication technologies, the name of "base station" may vary. The network device 120 may also be a location management function (LMF) entity.

The terminal 13 may include all kinds of handheld devices, vehicle devices, wearable devices, and computing devices, with wireless communication function, or other processing devices coupled to wireless modems, as well as various forms of user devices, mobile stations (MSs), terminal devices, and internet of things (IoT), etc. For ease of description, the device mentioned above is collectively referred to as the terminal. The network device 120 and the terminal 13 communicate with each other through some kind of air interface technology, for example, a Uu interface.

In an embodiment of the present disclosure, the network device 120 has one or a plurality of transmission reception points (TRPs), also known as transmission points, and each TRP has one or a plurality of antenna panels. The plurality of TRPs may simultaneously transmit data with one terminal 13.

For example, as illustrated in FIG. 1, two network devices 120 simultaneously send information carried on a PDCCH to the terminal 13 through one TRP. In some embodiments, one TRP sends information to the terminal 13 using one or the plurality of antenna panels.

The terminal 13 has at least two antenna panels, and a direction of a received beam of the antenna panel may be changed by adjusting a parameter of the antenna panel.

The communication system and service scenarios described in the embodiments of the present disclosure are intended to clearly illustrate the technical solution according to embodiments of the present disclosure, and do not form a limitation to the technical solutions according to the embodiments of the present disclosure. Those of ordinary skill in the art know that with the evolution of communication systems and the emergence of new service scenarios, the technical solutions according to the embodiments of the present disclosure are equally applicable to similar technical problems.

FIG. 2 is a flowchart of a method for transmitting information illustrated according to an embodiment. The method may be performed by a network device, as illustrated in FIG. 2. The method includes a following step S101:

In step 101, information carried on at least two PDCCHs is jointly sent through at least two TRPs or at least two antenna panels, and information carried on different PDCCHs in the at least two PDCCHs is transmitted through different TRPs or different antenna panels.

In the embodiment of the present disclosure, the information carried on the PDCCH is collaboratively transmitted through the plurality of TRPs or the plurality of antenna panels, so as to improve reliability of the PDCCH, thereby improving reliability and coverage of communication services, especially ultra-reliable and low latency communication (URLLC) services.

In the embodiment of the present disclosure, the information includes a demodulated reference signal (DMRS) and downlink control information (DCI), and the PDCCH carries the information in a unit of a resource element group (REG), in which the REG includes a plurality of first resource elements (REs) and a plurality of second REs in one REG, the first RE is used to carry the DMRS, and the second RE is used to carry the DCI.

In some embodiments, the plurality of first REs form at least two orthogonal DMRS ports in a manner of frequency-division multiplexing (FDM).

In some embodiments, the plurality of first REs are divided into at least two groups in a manner of frequency-division multiplexing, and the first REs in each group form two orthogonal DMRS ports in a manner of code-division multiplexing (CDM).

In some embodiments, the plurality of first REs form at least two orthogonal DMRS ports in a manner of code-division multiplexing.

In some embodiments, the DMRS occupies four first resource elements (REs) in the REG, and the four first REs are evenly distributed in the REG.

In some embodiments, the four first REs are a first one RE, a fourth one RE, a seventh one RE and a tenth one RE in the REs, respectively.

In some embodiments, DCI information carried on REs corresponding to different PDCCHs in the at least two PDCCHs is the same.

In some embodiments, DCI information carried on REs corresponding to different PDCCHs in the at least two PDCCHs is different.

In some embodiments, the DCI carried on the different PDCCHs in the at least two PDCCHs is scrambled using different scrambling codes; or CRC check bits of the DCI carried on the different PDCCHs in the at least two PDCCHs are scrambled using different scrambling codes.

In some embodiments, the network device configures the different scrambling codes; or the different scrambling codes are generated according to a predetermined rule based on one scrambling code configured by the network device; or the different scrambling codes are generated according to a predetermined rule based on a cell identification (ID).

In some embodiments, different PDCCHs in the at least two PDCCHs carry a part of encoded bits of one piece of DCI, and each part includes a plurality of consecutive encoded bits of the encoded bits of the one piece of the DCI.

It is noted that the above step 101 and the above optional steps may be combined arbitrarily.

FIG. 3 is a flowchart of a method for transmitting information illustrated according to an embodiment. The method may be performed by a terminal, as illustrated in FIG. 3. The method includes a following step S201:

In step 201, information carried on at least two physical downlink control channels (PDCCHs) and jointly sent through at least two transmission reception points (TRPs) or at least two antenna panels by a network device is received, information carried on different PDCCHs in the at least two PDCCHs is transmitted through different TRPs or different antenna panels.

In the embodiment of the present disclosure, the information carried on the PDCCH is collaboratively transmitted through the plurality of TRPs or the plurality of antenna panels, so as to improve reliability of the PDCCH, thereby improving reliability and coverage of communication services, especially ultra-reliable and low latency communication (URLLC) services.

In the embodiment of the present disclosure, the information includes a demodulated reference signal (DMRS) and downlink control information (DCI), and the PDCCH carries the information in a unit of a resource element group (REG), in which the REG includes a plurality of first resource elements (REs) and a plurality of second REs in one REG, the first RE is used to carry the DMRS, and the second RE is used to carry the DCI.

In some embodiments, the plurality of first REs form at least two orthogonal DMRS ports in a manner of frequency-division multiplexing (FDM).

In some embodiments, the plurality of first REs are divided into at least two groups in a manner of frequency-division multiplexing, and the first REs in each group form two orthogonal DMRS ports in a manner of code-division multiplexing (CDM).

In some embodiments, the plurality of first REs form at least two orthogonal DMRS ports in a manner of code-division multiplexing.

In some embodiments, the DMRS occupies four first REs in the REG, and the four first REs are evenly distributed in the REG.

In some embodiments, the four first REs are a first one RE, a fourth one RE, a seventh one RE and a tenth one RE in the REs, respectively.

In some embodiments, DCI information carried on REs corresponding to different PDCCHs in the at least two PDCCHs is the same.

In some embodiments, DCI information carried on REs corresponding to different PDCCHs in the at least two PDCCHs is different.

In some embodiments, the DCI carried on the different PDCCHs in the at least two PDCCHs is scrambled using different scrambling codes; or CRC check bits of the DCI carried on the different PDCCHs in the at least two PDCCHs are scrambled using different scrambling codes.

In some embodiments, the network device configures the different scrambling codes; or the different scrambling codes are generated according to a predetermined rule based on one scrambling code configured by the network device; or the different scrambling codes are generated according to a predetermined rule based on a cell identification (ID).

In some embodiments, different PDCCHs in the at least two PDCCHs carry a part of encoded bits of one piece of DCI, and each part includes a plurality of consecutive encoded bits of the encoded bits of the one piece of the DCI.

In some embodiments, the method further includes:

obtaining, by performing channel estimation according to a received DMRS, a channel estimation value of a corresponding PDCCH.

demodulating and channel-decoding a corresponding DCI according to the channel estimation value.

It is noted that the above step 201 and the above optional steps may be combined arbitrarily.

FIG. 4 is a flowchart of a method for transmitting information illustrated according to an embodiment. The method may be performed by a terminal and a network device together, as illustrated in FIG. 4. The method includes a following step S301:

In step 301, the network device maps information to resources corresponding to at least two PDCCHs.

In the embodiment of the present disclosure, the information carried on the PDCCH includes DMRS and DCI.

Through the step 301, the network device may carry information through at least two PDCCHs. Here, the resource refer to time-frequency resource.

For the PDCCH, the resource is in unit of REG. One REG corresponds to one orthogonal frequency division multiplexing (OFDM) symbol in a time domain and 12 subcarriers in a frequency domain. One REG includes 12 REs located in the same OFDM symbol.

In the embodiment of the present disclosure, one REG includes a plurality of first REs and a plurality of second REs, the first RE is used to carry the DMRS, the second RE is used to carry the DCI, and the second RE is a RE in the REG other than the first RE. In other words, in the embodiment of the present disclosure, the RE occupied by the DMRS is referred to as the first RE, and the RE occupied by the DCI is referred to as the second RE.

In some embodiments, in one REG, there are four REs occupied by the DMRS, that is, there are four first REs, and the four REs are evenly distributed in the REG.

In the related art, in one REG, a number of REs occupied by the DMRS is 3, which is ¼ of a number of REs in the REG, while in the embodiment of the present disclosure, a number of REs occupied by the DMRS is ⅓ of a number of REs in the REG. A density of the REs occupied by the DMRS is increased. Moreover, since the REs occupied by the DMRS is evenly distributed in the REG to which the REs belongs, the terminal may obtain optimal channel estimation performance by interpolation according to different RE positions of the DMRS in the PDCCH throughout the entire REG after receiving the PDCCH, thus further improving the reliability for transmitting the DCI information.

In some embodiments, different PDCCHs correspond to different DMRS ports, or different PDCCHs correspond to the same DMRS port. Here, the DMRS port refers to an antenna port used to send the DMRS. In the following, the PDCCH corresponding to a plurality of DMRS ports will be illustrated by taking four first REs evenly distributed in the REG to which the four first REs belong as an example.

Figure 5:
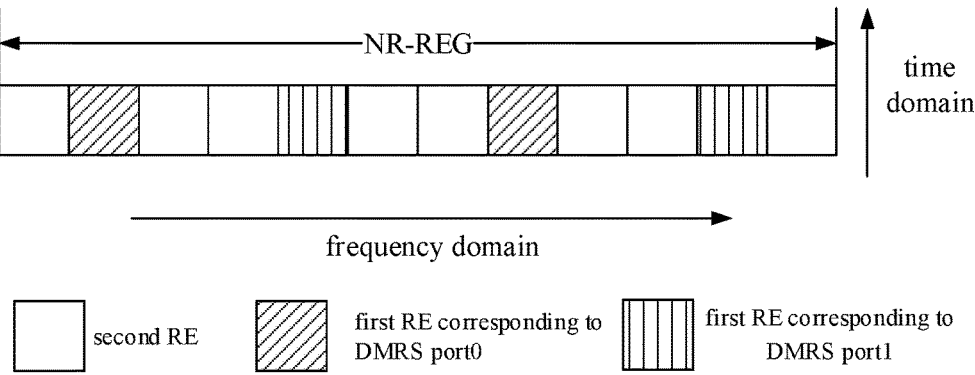
FIG. 5 is a resource distribution diagram of a PDCCH illustrated according to an embodiment.

FIG. 5 is a resource distribution diagram of a PDCCH provided by an embodiment of the present disclosure. As illustrated in FIG. 5, one REG includes 12 REs, i.e. a 0th one RE, a 1st one RE, a 2nd one RE . . . a 11th one RE. The DMRS occupies the first one RE, the fourth one RE, the seventh one RE and the tenth one RE. The DCI occupies the 0th one RE, the 2nd one RE to 3rd one RE, the 5th one RE to the 6th one RE, the 8th one RE to the 9th one RE and the 11th one RE.

In a first possible implementation, the plurality of first REs form at least two orthogonal DMRS ports in a manner of frequency-division multiplexing (FDM).

For example, as illustrated in FIG. 5, the first one RE and the seventh one RE form one DMRS port (such as port 0), and the fourth one RE and the tenth one RE form another DMRS port (such as port 1). It may be seen that in FIG. 5, the four first REs are divided as two groups in a manner of the FDM. Each group includes two first REs, and the first REs in each group form one DMRS port.

In this case, the two DMRS ports are orthogonalized using the frequency-division multiplexing, which may support the transmission of corresponding one layer of each TRP or each antenna panel.

As seen from FIG. 5, the first REs in each group of the first REs are also evenly distributed in the REG. Thus, for each PDCCH, optimal channel estimation performance may be obtained by interpolation according to different RE positions of the DMRS throughout the entire REG, thus further improving the reliability for transmitting the DCI.

In a second possible implementation, the plurality of first REs are divided into at least two groups in a manner of the FDM, and the first REs in each group form two orthogonal DMRS ports in a manner of code-division multiplexing (CDM).

As illustrated in FIG. 6, the four first REs are divided into two groups in a manner of the FDM. A group includes a first one RE and a seventh one RE, and the first one RE and the seventh one RE form two orthogonal DMRS ports (such as port0&2) in a manner of the CDM. The other group includes a fourth one RE and a tenth one RE, and the fourth one RE and the tenth one RE form another two orthogonal DMRS ports (such as port1&3) in a manner of the code-division multiplexing.

In some embodiments, in the second possible implementation, orthogonality of corresponding two DMRS ports is implemented using a time domain-orthogonal cover code (TD-OCC), which may support data transmission of corresponding two layers of each TRP or each antenna panel. In this case, each TRP or each antenna panel may correspond to different DMRS ports, for example, the PDCCH sent by one TRP may correspond to port0, and the PDCCH sent by another TRP may correspond to port2.

For example, TD-OCC code uses a form in Table 1.

TABLE 1

| TD-OCC code with a length of 2 | |
|---|---|
| serial number n | OCC code $w_n$ |
| 0 | [+1 +1] |
| 1 | [+1 −1] |

8

In a third possible implementation, the plurality of first REs form at least two orthogonal DMRS ports in a manner of code-division multiplexing.

As illustrated in FIG. 7, four first REs form two orthogonal DMRS ports in a manner of the CDM. The firs one t RE, the fourth one RE, the seventh one RE and the tenth one RE form at least two orthogonal DMRS ports (such as port0 and port1) in a manner of the CDM.

In some embodiments, in the third possible implementation, orthogonality of corresponding two DMRS ports is implemented using a TD-OCC with a length of 2, such as the TD-OCC illustrated in Table 1. This manner may support one or two orthogonal DMRS ports, thus supporting joint transmission of up to two PDCCHs.

In the third possible implementation, a number of formed DMRS ports is related to a length of the TD-OCC adopted by the CDM, and the number of the DMRS ports may be increased by using the TD-OCC with a greater length, thus supporting more TRPs or antenna panels to collaborate. For example, as illustrated in Table 2, the TD-OCC has a length of 4 and may support one to four orthogonal DMRS ports, thus supporting joint transmission of up to four PDCCHs.

TABLE 2

| TD-OCC code with a length of 4 | |
|---|---|
| n | $w_n$ |
| 0 | [+1 +1 +1 +1] |
| 1 | [+1 −j −1 +j] |
| 2 | [+1 −1 +1 −1] |
| 3 | [+1 +j −1 −j] |

For example, in the second and third possible implementations, the DMRS corresponding to the DMRS port is determined by a following formula (1):

$$y(k)=w_n \cdot d(k) \tag{1}$$

Where y(k) is a DMRS sequence after using a TD-OCC code; $w_n$ is the TD-OCC code; d(k) is an initial DMRS sequence.

The initial DMRS sequence is generated using a pseudo-random sequence according to a formula (2) on symbol l $$r_l(m) = \frac{1}{\sqrt{2}} \cdot (1 - 2 \cdot c(2m)) + j\frac{1}{\sqrt{2}} \cdot (1 - 2 \cdot c(2m + 1)) \tag{2}$$

In the formula (2), m is a serial number of a DMRS sequence, m=0, 1 . . . , M-1, M is equal to a bandwidth allocated by a PDCCH (i.e. a number of REGs multiplied by a number of REs in each REG), and c(i) is obtained by initializing a formula (3), $$c_{init} = \left(2^{17} \cdot \left(N_{symb}^{slot} \cdot n_{s,f}^u + l + 1\right) \cdot (2 \cdot N_{ID} + 1) + 2 \cdot N_{ID}\right) \bmod 2^{31} \tag{3}$$

In the formula (3), $$N_{symb}^{slot}$$

is a number of OFDM symbols in a time slot, for NR system, is fixed to 14;

$$n_{s,f}^u$$

is a time slot number in a wireless frame; l is a symbol position in a time slot; $N_{ID}\varepsilon\{0,1,\ldots,65535\}$, configured by a high-level parameter, if not configured by the high-level parameter, $$N_{ID} = N_{ID}^{cell},$$

i.e., equal to PCI.

In the embodiment of the present disclosure, by the arrangement of a plurality of DMRS ports, independent DCI information or a part of information of the same DCI may be sent on the same time-frequency resource using different DRMS ports, so as to achieve joint transmission of information carried on the PDCCH by a plurality of TRPs or a plurality of antenna panels.

In the embodiment of the present disclosure, joint transmission is also referred as to noncoherent-joint transmission (NC-JT).

It should be noted that in other embodiments, different PDCCHs correspond to the same DMRS port. In this case, DCI information carried on REs corresponding to different PDCCHs is also the same, that is, the information carried on different PDCCHs is the same, and is sent to the terminal through at least two TRPs and at least two antenna panels in a manner of space-division multiplexing (SDM).

In the embodiment of the present disclosure, the network device provides beams with different directions through N TRPs, and sends N PDCCHs through the beams with different directions, so as to achieve SDM transmission of the PDCCH.

In some embodiments, the N TRPs belong to the same network device, or different network devices.

In the embodiment, each TRP has only one antenna panel. In other embodiments, each TRP has a plurality of antenna panels, and different antenna panels of the same TRP may provide beams with different directions at different times. Thus, the network device may send the information carried on the PDCCH using different antenna panels.

For ease of understanding the embodiments of the present disclosure, the DCI is briefly described below. DCI is a payload carried on the PDCCH. In the embodiment of the present disclosure, DCI includes two parts, i.e. information body and verification information. The information body includes downlink scheduling allocation, uplink scheduling authorization, etc. The verification information is a CRC bit operated by a scrambling code, i.e. a modified CRC bit using a terminal identification. After receiving the DCI, the terminal uses the same process to calculate a scrambled CRC bit according to a received payload, and compare it with a received CRC bit. If the calculated CRC bit is the same as the received CRC bit, it means that the DCI is correctly received and belongs to the terminal. For example, the terminal identification is C-RNTI.

After CRC is scrambled, it is necessary to perform channel-encoding on the DCI to obtain an encoded bit (or an information bit) of the DCI. Then, after rate matching, scrambling the encoded bit of the DCI and modulating the scrambled bit, the DCI information is obtained and mapped to a corresponding RE.

It should be noted that in the embodiment of the present disclosure, the DCI information is information that is obtained after a series of processing of the DCI and carried on physical resource.

In the embodiment of the present disclosure, the DCI information carried on REs corresponding to different PDCCHs is the same or different.

When the DCI information carried on REs corresponding to different PDCCHs is the same, for each PDCCH, the same processing is performed for the aforementioned information part, for example, the same DCI is scrambled using the same scrambling code, and the same transmission parameter (such as a encoding parameter, a modulation parameter, a mapping parameter) is used for processing. In this case, the different PDCCHs sent by each TRP all carry the same DCI, and that is, the DCI carried by the PDCCH sent by each TRP is repeated, which supports single frequency network (SFN) transmission.

In the present embodiment, the scrambling code is predefined, or configured by the network device, such as through a high-level signaling.

When the DCI information carried on REs corresponding to different PDCCHs is different, it includes but is not limited to the following two cases:

a first case: the DCI carried on different PDCCHs in at least two PDCCHs is scrambled by using different scrambling codes, so as to obtain different DCI information.

a second case: CRC check bits of the DCI carried on the different PDCCHs in the at least two PDCCHs are scrambled using different scrambling codes, so as to obtain different DCI information.

In some embodiments, in the first and second cases, the network device configures the different scrambling codes. For example, the network device configures one scrambling code set, which includes a plurality of scrambling codes, such as (C-RNTI-1, C-RNTI-2, . . . , C-RNTI-m), where m denotes a serial number of a scrambling code, m is an integer greater than 1, for example, m equals a number of PDCCHs.

In some embodiments, the different scrambling codes are generated according to a predetermined rule based on one scrambling code configured by the network device. For example, if the network device configures one scrambling code, based on the scrambling code, at least two scrambling codes are generated according to the predetermined rule, and a number of generated scrambling codes corresponds to a number of PDCCHs.

In some embodiments, the different scrambling codes are generated according to a predetermined rule based on a physical cell identifier (PCI). For example, if the network device does not configure a scrambling code, at least two scrambling codes are generated according to the predetermined rule based on the PCI, and a number of generated scrambling codes corresponds to a number of PDCCHs.

For example, the predetermined rule include but are not limited to the following:

C-RNTI1=mod(1*C-RNTI,65536)=C-RNTI,

C-RNTI2=mod(2*C-RNTI,65536),

C -RNTI3=mod(3*C -RNTI, 65536),

C-RNTIm=mod(n*C-RNTI,65536).

C-RNTI is a scrambling code or a PCI configured by the network device, mod (x, y) denotes a remainder after division operation of x and y, and m denotes a serial number of a scrambling code.

In some embodiments, different PDCCHs in the at least two PDCCHs carry a part of encoded bits of one piece of DCI, and each part includes a plurality of consecutive encoded bits of the encoded bits of the one piece of the DCI.

For example, assuming that two TRPs jointly transmit two PDCCHs, one PDCCH carries a first half of encoded bits of DCI, and the other PDCCH carries a second half of the encoded bits of the DCI.

The step 301 includes: mapping the DMRS to a first RE in the REG, and mapping DCI information to a second RE in the REG.

It should be noted that in the cases illustrated in FIG. 5 and FIG. 6, the network device maps the DMRS corresponding to each PDCCH to the first RE corresponding to the PDCCH during resource mapping, while for the first REs corresponding to other PDCCHs, the first REs are reserved without carrying information during resource mapping. For example, assuming PDCCH1 corresponds to a first one RE and a seventh one RE, the corresponding DMRS is mapped to the first one RE and the seventh one RE, and the fourth one RE and the tenth one RE are reserved without carrying information.

In step 302, the network device jointly transmits the information carried on at least two PDCCHs through at least two TRPs or at least two antenna panels.

The information carried on different PDCCHs is transmitted through different TRPs or different antenna panels.

In some embodiments, one PDCCH corresponds to at least one DMRS port, such as one or two DMRS ports. Different PDCCHs correspond to different DMRS ports.

In step 303, the terminal receives the information carried on the at least two PDCCHs and jointly sent through the network device through at least two TRPs or at least two antenna panels.

After the terminal receives the information carried on at least two PDCCHs, channel estimation is firstly performed according to the DMRS in the PDCCHs to obtain a channel estimation value; then, the received information is demodulated and channel-decoded according to the channel estimation value, and DCI is obtained through independent or joint reception on a plurality of PDCCHs.

Here, the received information is channel-decoded according to the channel estimation value, which includes the following cases:

a first case, when transmission information of the same DCI carried on different PDCCHs (i.e. the aforementioned DCI information) is the same when mapped to a physical resource, the DCI carried on each PDCCH may be independently channel-decoded; or, the received DCI carried on each PDCCH may be soft-combined before being channel-decoded, and then DCI encoding information is channel-decoded.

a second case, when transmission information of the same DCI carried on different PDCCHs (i.e. the aforementioned DCI information) is the different when mapped to a physical resource, for example, in two cases which correspond to that the DCI information carried on REs corresponding to different PDCCHs is different in the step 301, the channel-decoding manners (i.e. a first manner, a second manner and a third manner illustrated below) are respectively described below:

For the first manner in which the DCI information carried on REs corresponding to different PDCCHs is different in step 301, the DCI carried on different PDCCH is scrambled using different scrambling codes, which means that the encoded bits of the DCI are scrambled using different scrambling codes, while the encoded bits of the DCI are scrambled after the channel-encoding, and thus, the soft-combination may be performed before the channel-decoding. In this way, there are two manners for the channel-decoding: 1, the DCI carried on each PDCCH is independently channel-decoded; 2, firstly, the received DCI carried on each PDCCH is soft-combined before being channel-decoded, and then DCI encoding information is channel-decoded.

For the second manner in which the DCI information carried on REs corresponding to different PDCCHs is different in step 301, since CRC scrambling is performed before the channel-encoding, the transmission information of the same DCI carried on PDCCH is different, and the soft-combination cannot be performed before the channel-encoding. In this way, independent channel decoding is required for information carried on each PDCCH.

For the third manner in which when different PDCCHs carry different parts of the same DCI, the received DCI encoding information carried on each PDCCH is combined before being channel-decoded, and then the channel-decoding is performed.

In the embodiments of the present disclosure, the DCI information corresponding to the same DCI is carried on a plurality of PDCCHs and transmitted through different TRPs or antenna panels, the terminal may receive the DCI information independently or jointly on the plurality of PDCCHs, so as to obtain a certain merging gain, and improve accuracy of the channel-decoding. Different parts of the same DCI is carried on a plurality of PDCCHs and transmitted through different TRPs or antenna panels, so as to obtain a certain diversity gain and improve accuracy of the channel-decoding.

FIG. 8 is a structural diagram of an apparatus for transmitting information illustrated according to an embodiment. The apparatus has function of achieving the terminal in the above method embodiments, and the function may be implemented by hardware or by executing corresponding software through hardware. As illustrated in FIG. 8, the apparatus 400 includes a transmission module 401. The transmission module 401 is jointly send, through at least two transmission reception points (TRPs) or at least two antenna panels, information carried on at least two PDCCHs, wherein information carried on different PDCCHs in the at least two PDCCHs is transmitted through different TRPs or different antenna panels.

In the embodiment of the present disclosure, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI.

In some embodiments, the plurality of first REs form at least two orthogonal DMRS ports in a manner of frequency-division multiplexing.

In some embodiments, the plurality of first REs are divided into at least two groups in a manner of frequency-division multiplexing, and the first REs in each group form two orthogonal DMRS ports in a manner of code-division multiplexing.

In some embodiments, the plurality of first REs form at least two orthogonal DMRS ports in a manner of code-division multiplexing.

In some embodiments, the DMRS occupies four first resource elements (REs) in the REG, and the four first REs are evenly distributed in the REG.

In some embodiments, the four first REs are a first one RE, a fourth one RE, a seventh one RE and a tenth one RE in the REs, respectively.

In some embodiments, DCI information carried on REs corresponding to different PDCCHs in the at least two PDCCHs is the same.

In some embodiments, DCI information carried on REs corresponding to different PDCCHs in the at least two PDCCHs is different.

In some embodiments, the DCI carried on the different PDCCHs in the at least two PDCCHs is scrambled using different scrambling codes; or CRC check bits of the DCI carried on the different PDCCHs in the at least two PDCCHs are scrambled using different scrambling codes.

In some embodiments, the network device configures the different scrambling codes; or the different scrambling codes are generated according to a predetermined rule based on one scrambling code configured by the network device; or the different scrambling codes are generated according to a predetermined rule based on a cell identification (ID).

In some embodiments, different PDCCHs in the at least two PDCCHs carry a part of encoded bits of one piece of DCI, and each part includes a plurality of consecutive encoded bits of the encoded bits of the one piece of the DCI.

FIG. 9 is a structural diagram of an apparatus for transmitting information illustrated according to an embodiment. The apparatus has function of achieving the network device in the above method embodiments, and the function may be implemented by hardware or by executing corresponding software through hardware. As illustrated in FIG. 9, the apparatus 500 includes a receiving module 501. The receiving module 501 is receive information carried on at least two PDCCHs and jointly sent through at least two transmission reception points (TRPs) or at least two antenna panels by a network device, wherein information carried on different PDCCHs in the at least two PDCCHs is transmitted through different TRPs or different antenna panels.

In the embodiment of the present disclosure, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI.

In some embodiments, the plurality of first REs form at least two orthogonal DMRS ports in a manner of frequency-division multiplexing.

In some embodiments, the plurality of first REs are divided into at least two groups in a manner of frequency-division multiplexing, and the first REs in each group form two orthogonal DMRS ports in a manner of code-division multiplexing.

In some embodiments, the plurality of first REs form at least two orthogonal DMRS ports in a manner of code-division multiplexing.

In some embodiments, the DMRS occupies four first resource elements (REs) in the REG, and the four first REs are evenly distributed in the REG.

In some embodiments, the four first REs are a first one RE, a fourth one RE, a seventh one RE and a tenth one RE in the REs, respectively.

In some embodiments, DCI information carried on REs corresponding to different PDCCHs in the at least two PDCCHs is the same.

In some embodiments, DCI information carried on REs corresponding to different PDCCHs in the at least two PDCCHs is different.

In some embodiments, the DCI carried on the different PDCCHs in the at least two PDCCHs is scrambled using different scrambling codes; or CRC check bits of the DCI carried on the different PDCCHs in the at least two PDCCHs are scrambled using different scrambling codes.

In some embodiments, the network device configures the different scrambling codes; or the different scrambling codes are generated according to a predetermined rule based on one scrambling code configured by the network device; or the different scrambling codes are generated according to a predetermined rule based on a cell identification (ID).

In some embodiments, different PDCCHs in the at least two PDCCHs carry a part of encoded bits of one piece of DCI, and each part includes a plurality of consecutive encoded bits of the encoded bits of the one piece of the DCI.

Figure 10:
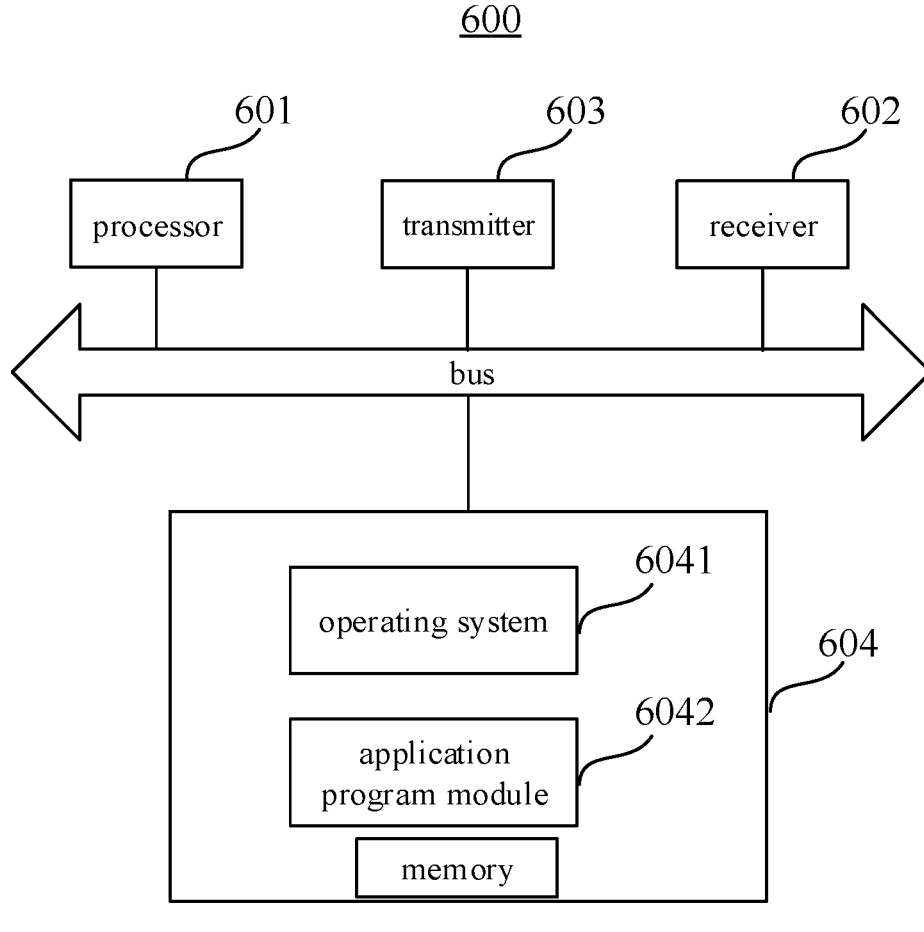
FIG. 10 is a block diagram of a network device illustrated according to an embodiment.

FIG. 10 is a block diagram of a network device 600 illustrated according to an embodiment. As illustrated in FIG. 10, the network device 600 may include: a processor 601, a receiver 602, a transmitter 603 and a memory 604. The receiver 602, the transmitter 603 and the memory 604 are respectively connected with the processor 601 through a bus.

The processor 601 includes one or a plurality of processing cores. The processor 601 executes the method executed by the network device in the method for transmitting information provided by the embodiments of the present disclosure by running software programs and modules. The memory 604 may be used to store the software programs and modules. Specifically, the memory 604 may store an application program module 6042 required by an operating system 6041 and at least one function. The receiver 602 is used to receive communication data sent by other devices, and the transmitter 603 is used to send communication data to other devices.

In the embodiment, a computer-readable storage medium is also provided. The computer-readable storage medium stores at least one instruction, at least one program, code set or instruction set. The at least one instruction, at least one program, code set or instruction set is loaded and executed by the processor to implement steps performed by the network device in the method for transmitting information provided by the above method embodiments.

Figure 11:
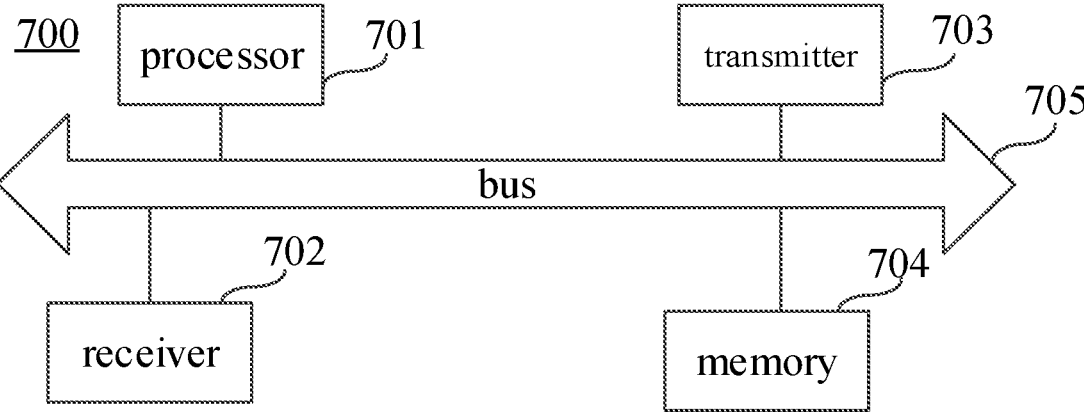
FIG. 11 is a block diagram of a terminal illustrated according to an embodiment.

FIG. 11 is a block diagram of a terminal 700 illustrated according to an embodiment. As illustrated in FIG. 11, the terminal 700 may include: a processor 701, a receiver 702, a transmitter 703, a memory 704 and a bus 705.

The processor 701 includes one or a plurality of processing cores. The processor 701 performs various functional applications and information processing by running software programs and modules.

The receiver 702 and transmitter 703 may be implemented as a communication component, which may be a communication chip.

The memory 704 is connected to the processor 701 through the bus 705.

The memory 704 may be used to store at least one instruction, and the processor 701 is used to execute the at least one instruction to execute the method executed by the terminal in the method for transmitting information provided by the embodiments of the present disclosure.

In addition, the memory 704 may be implemented using any type of volatile or non-volatile memory devices, or a combination thereof, which include but are not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In the embodiment, a computer-readable storage medium is also provided. The computer-readable storage medium stores at least one instruction, at least one program, code set or instruction set. The at least one instruction, at least one program, code set or instruction set is loaded and executed by the processor to implement steps performed by the terminal in the method for transmitting information provided by the above method embodiments.

An embodiment of the present disclosure also provides a communication system including a network device and a terminal. The network device is the network device provided by the embodiment illustrated in FIG. 10. The terminal is provided by the embodiment illustrated in FIG. 11.

A method for transmitting information is provided, performed by a network device, and includes:

jointly sending, through at least two transmission reception points TRPs or at least two antenna panels, information carried on at least two PDCCHs, wherein information carried on different PDCCHs in the at least two PDCCHs is transmitted through different TRPs or different antenna panels.

In some embodiments, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI;

the plurality of first REs form at least two orthogonal DMRS ports in a manner of frequency-division multiplexing.

In some embodiments, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI;

the plurality of first REs are divided into at least two groups in a manner of frequency-division multiplexing, and the first REs in each group form two orthogonal DMRS ports in a manner of code-division multiplexing.

In some embodiments, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI;

the plurality of first REs form at least two orthogonal DMRS ports in a manner of code-division multiplexing.

In some embodiments, there are four first REs evenly distributed in the REG.

In some embodiments, the four first REs are a first one RE, a fourth one RE, a seventh one RE and a tenth one RE in the REs, respectively.

In some embodiments, DCI information carried on REs corresponding to different PDCCHs in the at least two PDCCHs is the same.

In some embodiments, DCI information carried on REs corresponding to different PDCCHs in the at least two PDCCHs is different.

In some embodiments, the DCI carried on the different PDCCHs in the at least two PDCCHs is scrambled using different scrambling codes; or CRC check bits of the DCI carried on the different PDCCHs in the at least two PDCCHs are scrambled using different scrambling codes.

In some embodiments, a network device configures the different scrambling codes; or, the different scrambling codes are generated according to a predetermined rule based on one scrambling code configured by a network device; or the different scrambling codes are generated according to a predetermined rule based on a cell ID.

In some embodiments, different PDCCHs in the at least two PDCCHs carry a part of encoded bits of one piece of DCI, and each part includes a plurality of consecutive encoded bits of the encoded bits of the one piece of the DCI.

A method for transmitting information is provided, performed by a terminal, and includes:

receiving information carried on at least two PDCCHs and jointly sent by a network device through at least two transmission reception points TRPs or at least two antenna panels, wherein information carried on different PDCCHs in the at least two PDCCHs is transmitted through different TRPs or different antenna panels.

In some embodiments, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI;

the plurality of first REs form at least two orthogonal DMRS ports in a manner of frequency-division multiplexing.

In some embodiments, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI;

the plurality of first REs are divided into at least two groups in a manner of frequency-division multiplexing, and the first REs in each group form two orthogonal DMRS ports in a manner of code-division multiplexing.

In some embodiments, the information includes a demodulated reference signal DMRS and downlink control information DCI, and the PDCCH carries the information in a unit of a resource element group REG, in which the REG includes a plurality of first resource elements REs and a plurality of second REs in one REG, the first RE is used to carry the DMRS, and the second RE is used to carry the DCI;

the plurality of first REs form at least two orthogonal DMRS ports in a manner of code-division multiplexing.

In some embodiments, there are four first REs evenly distributed in the REG.

In some embodiments, the four first REs are a first one RE, a fourth one RE, a seventh one RE and a tenth one RE in the REs, respectively.

In some embodiments, DCI information carried on REs corresponding to different PDCCHs in the at least two PDCCHs is the same.

In some embodiments, DCI information carried on REs corresponding to different PDCCHs in the at least two PDCCHs is different.

In some embodiments, the DCI carried on the different PDCCHs in the at least two PDCCHs is scrambled using different scrambling codes to obtain different DCI information; or CRC check bits of the DCI carried on the different PDCCHs in the at least two PDCCHs are scrambled using different scrambling codes.

In some embodiments, the different scrambling codes are configured by a network device; or, the different scrambling codes are generated according to a predetermined rule based on one scrambling code configured by a network device; or the different scrambling codes are generated according to a predetermined rule based on a cell ID.

In some embodiments, different PDCCHs in the at least two PDCCHs carry a part of encoded bits of one piece of DCI, and each part includes a plurality of consecutive encoded bits of the encoded bits of the one piece of the DCI.

An apparatus for transmitting information is provided and includes:

a transmission module, configured to jointly send, through at least two transmission reception points TRPs or at least two antenna panels, information carried on at least two PDCCHs, wherein information carried on different PDCCHs in the at least two PDCCHs is transmitted through different TRPs or different antenna panels.

An apparatus for transmitting information is provided and includes:

a receiving module, configured to receive information carried on at least two PDCCHs and jointly sent through at least two transmission reception points TRPs or at least two antenna panels by a network device, wherein information carried on different PDCCHs in the at least two PDCCHs is transmitted through different TRPs or different antenna panels.

A network device is provided and includes:

a processor;

a memory configured to store executable instructions of the processor, wherein the processor is configured to load and execute the executable instructions to implement the above method for transmitting information performed by the network device.

A terminal is provided and includes:

a processor;

a memory configured to store executable instructions of the processor, wherein the processor is configured to load and execute the executable instructions to implement the above method for transmitting information performed by the terminal.

A non-volatile computer-readable storage medium, wherein when instructions in the computer-readable storage medium is executed by a processor, causes the processor to execute the above method for transmitting information performed by the network device, or cause the processor to execute the above method for transmitting information performed by the terminal.

Other embodiments of the present disclosure will be apparent to those skilled in the art from consideration of the specification and practice of the disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for transmitting information, performed by a network device, comprising:

jointly sending, through at least two transmission reception points (TRPs) or at least two antenna panels, information carried on at least two physical downlink control channels (PDCCHs), wherein information carried on different PDCCHs in the at least two PDCCHs is transmitted through different TRPs or different antenna panels;

wherein the information comprises a demodulated reference signal (DMRS) and downlink control information (DCI), and the PDCCH carries the information in a unit of a resource element group (REG), the REG comprises a plurality of first resource elements (REs) and a plurality of second REs, wherein the plurality of first REs are used to carry the DMRS, and the plurality of second REs are used to carry the DCI;

wherein the plurality of first REs form at least two orthogonal DMRS ports in one of following manners:
frequency-division multiplexing;
dividing the plurality of first REs into at least two groups in a manner of frequency division multiplexing, and forming two orthogonal DMRS ports in at least one group of first REs in a manner of code division multiplexing; or
code-division multiplexing;

wherein there are four first REs evenly distributed in the REG; and the four first REs are a first one RE, a fourth one RE, a seventh one RE, and a tenth one RE in the REs, respectively.

2. The method according to claim 1, wherein downlink control information (DCI) information carried on resource elements (REs) corresponding to different PDCCHs in the at least two PDCCHs is the same.

3. The method according to claim 1, wherein downlink control information (DCI) information carried on resource elements (REs) corresponding to different PDCCHs in the at least two PDCCHs is different.

4. The method according to claim 3, wherein the DCI carried on the different PDCCHs in the at least two PDCCHs is scrambled using different scrambling codes; or CRC check bits of the DCI carried on the different PDCCHs in the at least two PDCCHs are scrambled using different scrambling codes;

wherein the network device configures the different scrambling codes; or, wherein the different scrambling codes are generated according to a predetermined rule based on one scrambling code configured by the network device; or wherein the different scrambling codes are generated according to a predetermined rule based on a cell identification (ID).

5. The method according to claim 1, wherein different PDCCHs in the at least two PDCCHs carry a part of encoded bits of one piece of downlink control information (DCI), and at least one part of the encoded bits of the one piece of the DCI comprises a plurality of consecutive encoded bits of the encoded bits of the one piece of the DCI.

6. A method for transmitting information, performed by a terminal, comprising:

receiving information carried on at least two physical downlink control channels (PDCCHs) and jointly sent by a network device through at least two transmission reception points (TRPs) or at least two antenna panels, wherein information carried on different PDCCHs in the at least two PDCCHs is transmitted through different TRPs or different antenna panels;

wherein the information comprises a demodulated reference signal (DMRS) and downlink control information (DCI), and the PDCCH carries the information in a unit of a resource element group (REG), the REG comprises a plurality of first resource elements (REs) and a plurality of second REs, wherein the plurality of first REs are used to carry the DMRS, and the plurality of second REs are used to carry the DCI;

wherein the plurality of first REs form at least two orthogonal DMRS ports in one of following manners: frequency-division multiplexing;

dividing the plurality of first REs into at least two groups in a manner of frequency division multiplexing, and forming two orthogonal DMRS ports in at least one group of first REs in a manner of code division multiplexing; or code-division multiplexing;

wherein there are four first REs evenly distributed in the REG; and the four first REs are a first one RE, a fourth one RE, a seventh one RE and a tenth one RE in the REs, respectively.

7. The method according to claim 6, wherein downlink control information (DCI) information carried on resource elements (REs) corresponding to different PDCCHs in the at least two PDCCHs is the same.

8. The method according to claim 6, wherein downlink control information (DCI) information carried on resource elements (REs) corresponding to different PDCCHs in the at least two PDCCHs is different.

9. The method according to claim 8, wherein the DCI carried on the different PDCCHs in the at least two PDCCHs is scrambled using different scrambling codes to obtain different DCI information; or CRC check bits of the DCI carried on the different PDCCHs in the at least two PDCCHs are scrambled using different scrambling codes;

wherein the different scrambling codes are configured by the network device; or, the different scrambling codes are generated according to a predetermined rule based on one scrambling code configured by the network device; or the different scrambling codes are generated according to a predetermined rule based on a cell identification (ID).

10. The method according to claim 6, wherein different PDCCHs in the at least two PDCCHs carry a part of encoded bits of one piece of downlink control information (DCI), and at least one part of the encoded bits of the one piece of the DCI comprises a plurality of consecutive encoded bits of the encoded bits of the one piece of the DCI.

11. A terminal, comprising:

at least one processor;

a memory configured to store executable instructions of the at least one processor, wherein the at least one processor is configured to load and execute the executable instructions to implement the method for transmitting information according to claim 6.

12. A network device, comprising:

at least one processor;

a memory configured to store executable instructions of the at least one processor, wherein the at least one processor is configured to load and perform:

jointly send, through at least two transmission reception points (TRPs) or at least two antenna panels, information carried on at least two physical downlink control channels (PDCCHs), wherein information carried on different PDCCHs in the at least two PDCCHs is transmitted through different TRPs or different antenna panels;

wherein the information comprises a demodulated reference signal (DMRS) and downlink control information (DCI), and the PDCCH carries the information in a unit of a resource element group (REG), the REG comprises a plurality of first resource elements (REs) and a plurality of second REs, wherein the plurality of first REs are used to carry the DMRS, and the plurality of second REs are used to carry the DCI;

wherein the plurality of first REs form at least two orthogonal DMRS ports in one of following manners: frequency-division multiplexing;

dividing the plurality of first REs into at least two groups in a manner of frequency division multiplexing, and forming two orthogonal DMRS ports in at least one group of first REs in a manner of code division multiplexing; or code-division multiplexing;

wherein there are four first REs evenly distributed in the REG; and the four first REs are a first one RE, a fourth one RE, a seventh one RE, and a tenth one RE in the REs, respectively.

* * * * *